United States Patent [19]

Egeberg

[11] Patent Number: 5,640,139
[45] Date of Patent: Jun. 17, 1997

[54] WIRELESS CONTROL OF ELECTRONIC DOOR LOCKING DEVICES FOR TRAILERS

[76] Inventor: Gerald W. Egeberg, 3500 Jonquil Ct., Marion, Iowa 52302

[21] Appl. No.: 527,997

[22] Filed: Sep. 14, 1995

[51] Int. Cl.⁶ .................................................. B60R 25/10
[52] U.S. Cl. .................. 340/426; 340/425.5; 340/988; 340/993; 342/357; 342/457; 307/10.2
[58] Field of Search .................. 340/425.5, 426, 340/539, 825.69, 825.72, 990, 993, 996, 988, 438; 379/57, 58, 59, 63; 343/700 MS, 727, 728; 180/287; 342/357, 457; 307/10.2

[56] References Cited

U.S. PATENT DOCUMENTS

| | | | |
|---|---|---|---|
| 5,223,844 | 6/1993 | Mansell et al. | 342/357 |
| 5,300,936 | 4/1994 | Izadian | 343/700 MS |
| 5,334,974 | 8/1994 | Simms | 340/990 |
| 5,357,560 | 10/1994 | Nykerk | 340/426 |
| 5,467,070 | 11/1995 | Drori et al. | 340/426 |
| 5,475,597 | 12/1995 | Buck | 340/438 |
| 5,490,200 | 2/1996 | Snyder et al. | 379/57 |
| 5,532,521 | 7/1996 | Leininger | 307/10.2 |

*Primary Examiner*—Brent A. Swarthout
*Assistant Examiner*—Van T. Trieu
*Attorney, Agent, or Firm*—Gregory G. Williams; M. Lee Murrah; George A. Montanye

[57] ABSTRACT

A system for preventing theft of cargo from a cargo area of a truck is disclosed. The system includes a lock for locking shut a door to the cargo area of the truck when the lock is engaged. The lock allows the door to the cargo area to be opened when the lock is disengaged. A receiver receives a signal from a remote location. The lock is controlled in response to the signal received from the remote location such that the lock is disengaged when the signal received from the remote location is indicative of predetermined information.

4 Claims, 2 Drawing Sheets

WIRELESS CONTROL OF ELECTRONIC DOOR LOCKING DEVICES FOR TRAILERS

BACKGROUND OF THE INVENTION

The present invention relates to truck cargo transportation, and more particularly, to a remotely controlled locking system which prevents theft of cargo from the cargo area of a truck.

In the trucking industry, theft of goods or cargo from the trailer or cargo area of trucks is a serious problem. The theft of cargo frequently occurs within the distribution cycle while the trucks are enroute to the intended receiver. Unauthorized entry into the cargo area of the trucks is often gained by use of duplicate lock keys or codes for non-key locks, by cutting or damaging of locks, or by oversights in engaging locks.

Theft of cargo in this manner causes substantial financial losses to one or more of the shipper, the transporter of the cargo and the receiver. Because the theft frequently occurs while the trucks are enroute between the shipper's location and the receiver's location, prevention of the theft is very difficult. Further, it is difficult to determine where the theft occurred, thus making capture of the thieves more difficult as well. Therefore, there is a need for a system for preventing theft of cargo from the cargo areas of trucks.

SUMMARY OF THE INVENTION

It is an object of the present invention to provide a system for preventing theft of cargo from a cargo area of a truck. It is a second object of the present invention to provide a locking system for the cargo area of a truck which is controllable by satellite and/or other forms of communicating from a remote location. It is a third object of the present invention to provide a locking system for the cargo area of a truck which prevents the lock from being disengaged prior to the truck arriving at a predetermined location. The present invention achieves these and other objects discussed throughout this application.

A system for preventing theft of cargo from a cargo area of a truck is disclosed. The system includes a lock for locking shut a door to the cargo area of the truck when the lock is engaged. The lock allows the door to the cargo area to be opened when the lock is disengaged. A receiver receives a signal from a remote location. The lock is controlled in response to the signal received from the remote location such that the lock is disengaged only when the signal received from the remote location is indicative of predetermined information.

BRIEF DESCRIPTION OF THE DRAWINGS

The invention may be more fully understood by reading the following description of a preferred embodiment of the invention in conjunction with the appended drawings wherein.

DETAILED DESCRIPTION OF THE PREFERRED EMBODIMENTS

The present invention is a system for preventing theft of cargo from a cargo area of a truck. The theft prevention system of the present invention uses satellite or other types of remote communication to provide remote control of the trailer door lock device in order to prohibit unauthorized access to the cargo area of the truck. In some embodiments, the present invention uses global positioning system (GPS) satellites and a GPS receiver to prohibit access to the cargo area of the truck prior to the truck's arrival at a predetermined location.

Figure 1:
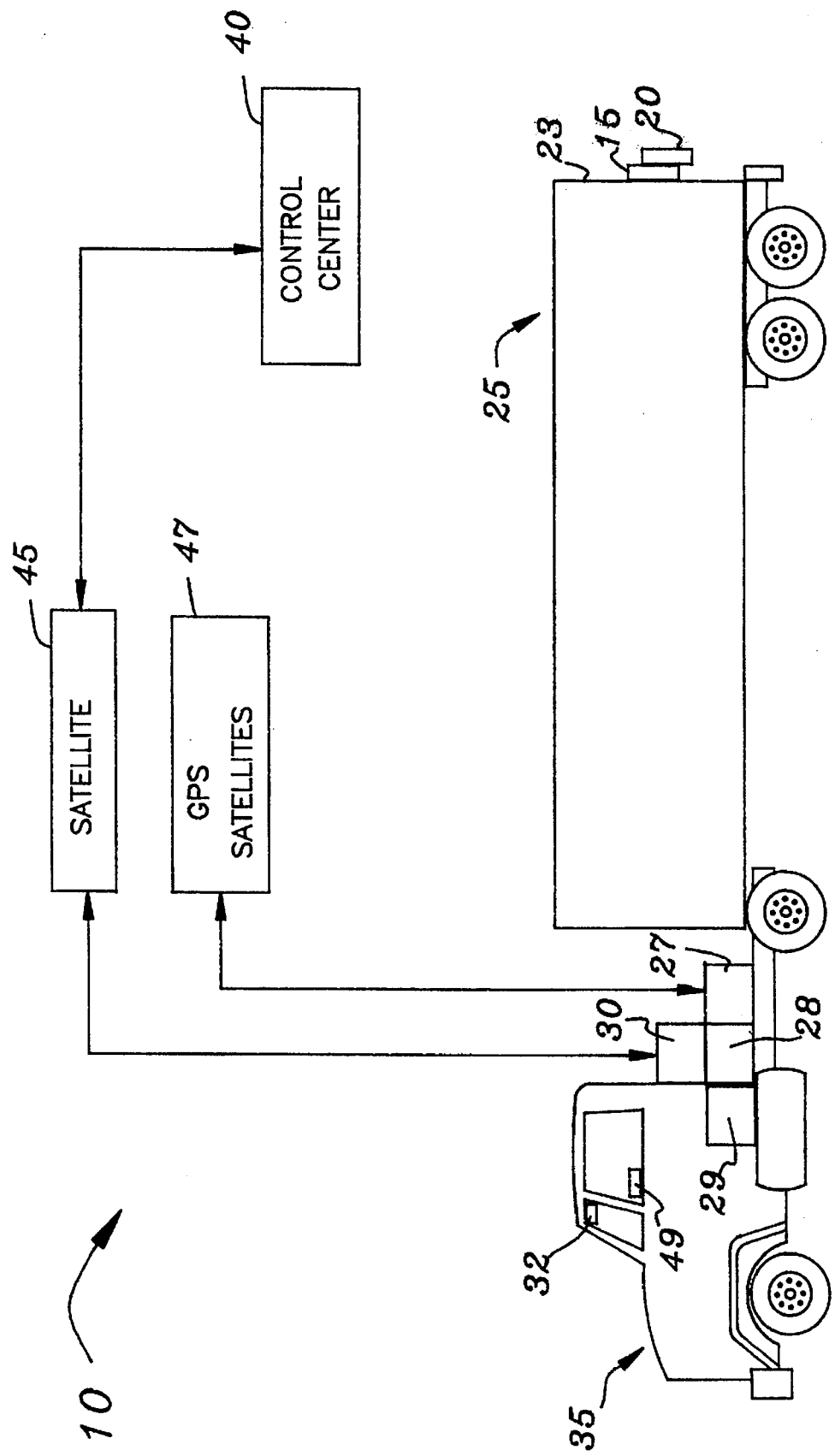
FIG. 1 is a diagrammatic side view of a semi-trailer type truck having the truck cargo theft prevention system of the present invention installed thereon.
Figure 2:
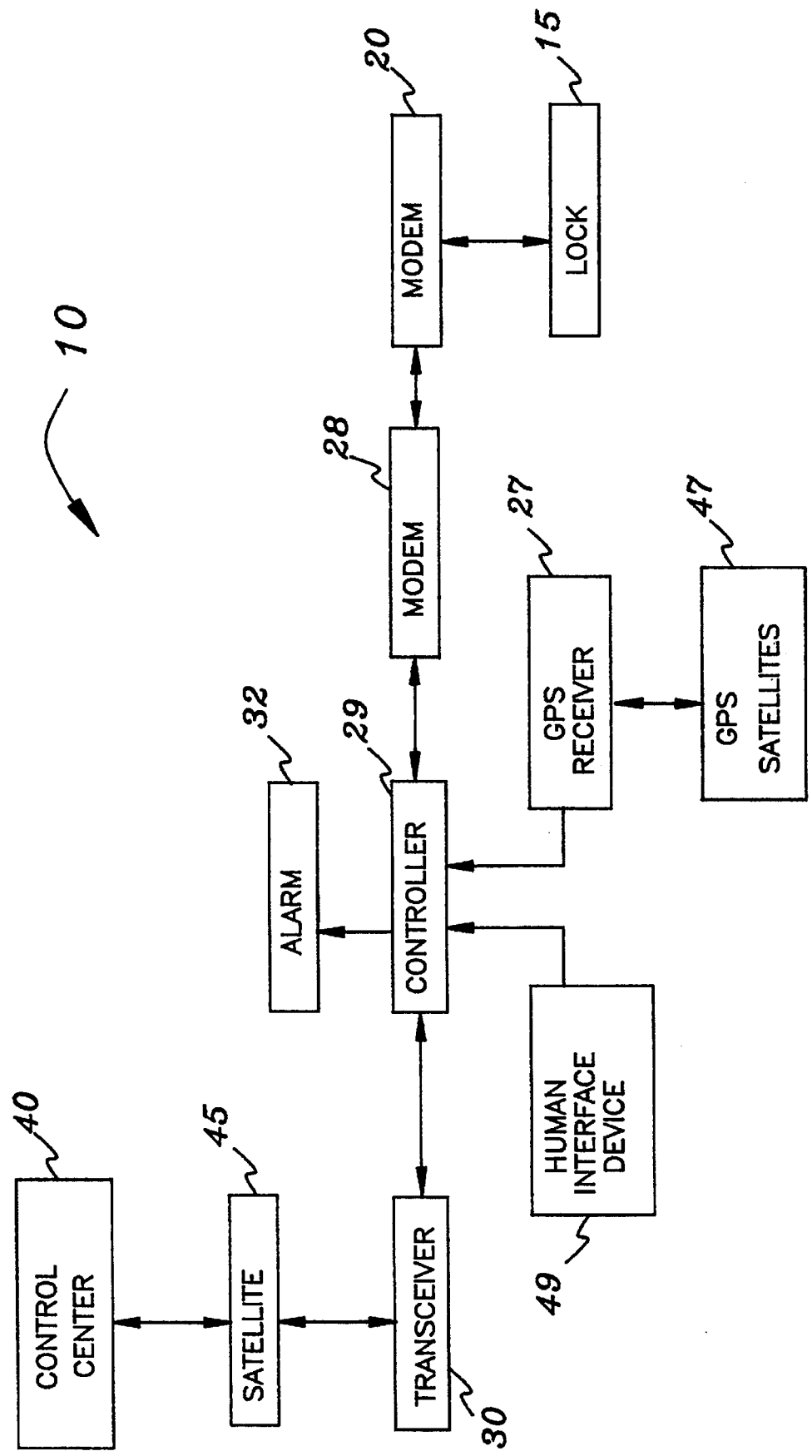
FIG. 2 is a block diagram of the truck cargo theft prevention system of the present invention illustrated in FIG. 1.

FIG. 1 is a diagrammatic side view of a semi-trailer type truck having truck cargo theft prevention system 10 of the present invention installed thereon. FIG. 2 is a block diagram of truck cargo theft prevention system 10 illustrated in FIG. 1. In preferred embodiments, theft prevention system 10 includes lock 15 and modem 20 attached to trailer 25. Theft prevention system 10 also includes GPS receiver 27, modem 28, controller 29, transceiver 30, alarm 32 and human interface device 49 attached to tractor or cab 35 of the truck. Finally, in preferred embodiments, theft prevention system 10 includes or utilizes communication satellite 45, GPS satellites 47 and remotely located control center 40.

In various other embodiments of the present invention, one or more of the components of theft prevention system 10 listed above are omitted or replaced. For example, as discussed below in greater detail, in some embodiments of the present invention, lock 15 is controlled as a function of either a communication signal received from satellite 45 or as a function of GPS signals received from GPS satellites 47, but not as a function of both. In these embodiments, one or more of the satellite communications components of system 10 can be omitted. However, in preferred embodiments lock 15 is controlled as a function of both signals from communications satellite 45 and signals from GPS satellites 47. Further, in other embodiments, control center 40 controls lock 15 by way of other types of communication links such as cellular or radio communications. In these embodiments, satellite 45 and transceiver 30 can be replaced with their functional equivalents.

Lock 15 is a device which, when engaged, prevents or deters the opening of door 23 to the cargo area of trailer 25. When disengaged, lock 15 allows door 23 to be opened, providing access to the cargo area. Lock 15 can be integrated into door 23, or it can be a portable device attachable to door 23. Modems 20 and 28 are of the type well known in the art capable of receiving and/or transmitting information containing signals. Modem 20 is electrically coupled to lock 15 such that it can transmit signals in response to an output from lock 15 and/or it can receiver signals and provide an output which is used to control the operation of lock 15.

Controller 29 is preferably a microprocessor based device, having associated memory for data storage, capable of receiving inputs from one or more of the components of theft prevention system 10 and providing output signals capable of controlling one or more of the components of system 10 in the manner discussed below. However, in other embodiments, controller 29 is a programmable logic controller or other digital or analog circuitry which can be adapted to control the components of system 10. Controller is coupled to modem 28 for communication, through modem 20, with lock 15.

Alarm 32 is coupled to controller 29 and is preferably an alarm of the type known in the art which produces a visible or audible warning signal in response to a control signal from controller 29. GPS receiver 27 and GPS satellites 47 are of the type well known in the art used to accurately determine the physical location of the receiver. GPS receiver 27 is coupled to controller 29 to provide controller 29 with an output signal indicative of the physical location of the truck.

Transceiver 30 is preferably a satellite communications transceiver of the type well known in the art adapted for communicating, through satellite 45, with control center 40. However, in other embodiments, transceiver 30 is a radio or cellular communications transceiver for communicating with control center 40 by means other than through satellite 45. Transceiver 30 provides two way communications between controller 29 and control center 40 such that control center can provide control 29 with coded signals to control lock 15, and so that controller 29 can query control center 40 for information or notify control center 40 of alarm conditions such as an unauthorized entry into the cargo area of trailer 25. Human interface device 49 is coupled to controller 29 for allowing the truck driver or other authorized persons to communicate with control center 40 and/or to control lock 15 and alarm 32. In preferred embodiments, interface device 49 is a keypad entry device. Human interface device 49 can, in other embodiments, be coupled directly to lock 15 to allow the truck driver or an authorized person at the receiver's location to disengage lock 15. This allows lock 15 to be disengaged at some time after cab 15 of the truck has departed from the area.

In preferred embodiments, theft prevention system 10 operates generally as follows. After the cargo has been loaded into the cargo area of trailer 25 at the shipper's location, lock 15 is engaged. Lock 15 can be engaged manually or electronically. In some preferred embodiments, lock 15 is engaged electronically by controller 29 in response to a control signal received by the controller from control center 40. As discussed above, the control signal from control center 40 is preferably received through satellite 45. However, it can be received by other modes of communication as well. In response to receipt of the control signal from control center 40, controller 29 generates its own control signal output which is transmitted through modems 28 and 20 to lock 15. Lock 15 automatically engages in response to the control signal received from controller 29.

If lock 15 is tampered with while the truck is in transit between the shipper's location and the receiver's location, lock 15 generates an output in response which is indicative of an attempt at unauthorized entry into the cargo area of trailer 25. Modem 20 receives the output of lock 15 and transmits a signal, indicative of the same information, to modem 28 in cab 35 of the truck. Modem 28 provides an output, also indicative of the unauthorized entry, to controller 29. In response, controller 29 does one or more of the following. Controller 29 generates an alarm control center which causes alarm 32 to activate. Controller 29 can also, based upon the location of the truck as determined by the output of GPS receiver 27, notify control center 40 of the location at which the possible theft is taking place. As discussed above, controller 29 notifies control center 40 by generating a transceiver control signal which causes transceiver 30 to transmit the desired information through satellite 45 to control center 40.

In preferred embodiments, once the truck has arrived at the receiver's location, lock 15 is disengaged as follows. The truck driver or another authorized person notifies control center 40 of the truck's arrival using interface device 49 and requests that lock 15 be disengaged. In response to the message input into interface device 49, controller 29 causes transceiver 30 to transmit the message to control center 40. Control center 40 responds by transmitting a coded message back to controller 29 which instructs or authorizes controller 29 to disengage lock 15. In response, controller 29 transmits a control signal, through modems 28 and 20, which causes lock 15 to disengage.

In some embodiments, controller 29 determines the location of the truck from GPS receiver 27 and compares the current location to a pre-programmed desired location (i.e. the receiver's location). If the current location is not the same as the pre-programmed desired location, either controller 29 does not request control center 40 to transmit the coded authorization message, or controller 29 does not transmit the control signal to disengage lock 15 despite having received authorization from control signal 40. In either case, theft prevention system 10 requires that the truck be at the intended destination prior to disengaging the lock. Also, when lock 15 is disengaged, the location of the truck is preferably either recorded by controller 29 or transmitted to control center 40 for future reference.

Occasionally, a truck driver will be required to allow a police officer or other authorized public employees access to the cargo area of the truck for inspection purposes. However, if the truck is not at the pre-programmed desired location, theft prevention system 10 will prevent entry. Therefore, in preferred embodiments, the driver of the truck can disengage lock 15 by inputting, into human interface device 49, an authorization or access code. In response to input of the code, controller 29 generates control signals to disengage lock 15 regardless of the physical location of the truck.

While particular embodiments of the present invention have been shown and described, it should be clear that changes and modifications may be made to such embodiments without departing from the true scope and spirit of the invention. For example, in other embodiments of the invention, some components can be placed in different physical locations, allowing hard-wiring of certain components and eliminating the need for other components such as modems 20 and 28. Further, it is not necessary that all of the various features and components discussed above be included in all embodiments of the present invention. It is intended that the appended claims cover these and other such changes and modifications.

I claim:

1. A system for preventing theft of cargo from a cargo area of a truck, the system comprising:

a lock for locking shut a door to the cargo area when the lock is engaged, the lock allowing the door to the cargo area to be opened when the lock is disengaged;

means for receiving a signal transmitted from a remote location;

means for controlling the lock in response to the signal received from the remote location such that the lock is disengaged when the signal received from the remote location is indicative of predetermined information, the means for controlling the lock being coupled to the means for receiving a signal from the remote location and being coupled to the lock;

wherein the means for receiving the signal from a remote location includes a first satellite transceiver for receiving a signal from a first satellite;

wherein the first Satellite is a communications satellite and wherein the signal received from the first satellite corresponds to a signal originating from a control center, the predetermined information including a code that allows the means for controlling the lock to disengage the lock; and means for receiving a signal from a second satellite, the second satellite being a GPS satellite, a position of the truck being determined as a function of the signal received from the second satellite, wherein the means for controlling the lock in response to the signal received from the first satellite further controls the lock such that the lock is disengaged when both the signal received from the first satellite is indicative of predetermined information and the determined position of the truck is substantially the same as a predetermined desired position of the truck.

2. The system of claim 1, wherein the first satellite is a GPS satellite and wherein the means for receiving a signal from the first satellite includes a GPS receiver, the predetermined information being indicative of the truck being positioned at a predetermined location.

3. The method of claim 1 and further comprising:
means for detecting tampering with the lock; and
an alarm coupled to the means for detecting tampering with the lock, the alarm providing a warning if tampering with the lock is detected.

4. The method of claim 1, and further comprising:
means for detecting tampering with the lock; and
means for transmitting a signal to a remote location to provide notification to persons at the remote location of tampering with the lock.

* * * * *